US012645535B2

(12) United States Patent (10) Patent No.: US 12,645,535 B2
Kaynak et al. (45) Date of Patent: Jun. 2, 2026

(54) DECODING DATA USING A CONSTRAINED BIT-FLIPPING TECHNIQUE

(71) Applicant: MICRON TECHNOLOGY, INC., Boise, ID (US)

(72) Inventors: Mustafa N. Kaynak, San Diego, CA (US); Mariano Burich, San Diego, CA (US); Eyal En Gad, Fremont, CA (US); Sivagnanam Parthasarathy, Carlsbad, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 57 days.

(21) Appl. No.: 18/913,790

(22) Filed: Oct. 11, 2024

(65) Prior Publication Data

US 2026/0104962 A1 Apr. 16, 2026

(51) Int. Cl.
G06F 11/10 (2006.01)
(52) U.S. Cl.
CPC ........ G06F 11/1068 (2013.01); G06F 11/106 (2013.01)
(58) Field of Classification Search
None
See application file for complete search history.

(56) References Cited

U.S. PATENT DOCUMENTS

| | | | | |
|---|---|---|---|---|
| 10,063,258 B2 * | 8/2018 | Goldenberg | ........ | H03M 13/612 |
| 10,409,672 B2 * | 9/2019 | Pignatelli | ............ | G06F 11/1012 |
| 2018/0262215 A1 * | 9/2018 | Sharon | ................ | G06F 11/1012 |
| 2018/0375530 A1 * | 12/2018 | Palangappa | ......... | G06F 11/1032 |
| 2024/0168847 A1 * | 5/2024 | Kaynak | ............... | G06F 11/1012 |
| 2025/0131971 A1 * | 4/2025 | Gherman | ............ | H03M 13/453 |
| 2025/0147839 A1 * | 5/2025 | Chung | ................ | G06F 11/1012 |

OTHER PUBLICATIONS

H. Wang, K. Zhao, M. Lv, X. Zhang, H. Sun and T. Zhang, "Improving 3D DRAM Fault Tolerance Through Weak Cell Aware Error Correction," in IEEE Transactions on Computers, vol. 66, No. 5, pp. 820-833, May 1, 2017, (Year: 2017).*

* cited by examiner

*Primary Examiner* — Mark D Featherstone
*Assistant Examiner* — Daniel F. McMahon
(74) *Attorney, Agent, or Firm* — Tarolli, Sundheim, Covell & Tummino LLP

(57) ABSTRACT

A system and method are disclosed for decoding data from a memory device. For example, a controller can perform a read operation to receive the data. The controller executes a first decoding operation to correct a bit error in one or more weak bits of the data. In some instances, during the first decoding operation, one or more strong bits are skipped. The controller determines whether any bit errors remain in the data in response to the execution of the first decoding operation. The controller executes a second decoding operation to correct a bit error in one or more strong bits of the data and any remaining weak bits in the data that had not been corrected by the decoder during the first decoding operation in response to determining the data has errors. The controller outputs corrected data in response to correcting errors in the data.

20 Claims, 4 Drawing Sheets

DECODING DATA USING A CONSTRAINED BIT-FLIPPING TECHNIQUE

TECHNICAL FIELD

This disclosure relates to error decoding, and more particularly, to decoding data using a constrained bit-flipping technique.

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices. Not-AND (NAND) flash memory is a type of non-volatile storage technology used in electronic devices and computers for data storage. In NAND flash memory, data is stored in memory cells that can hold electrical charges, representing data bits. Error Correction Codes (ECC), such as Low-Density PC (LDPC) codes are used to correct errors that occur during a reading and writing processes of memory cells of memory devices, such as NAND memory devices.

DETAILED DESCRIPTION

Figure 1:
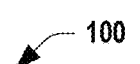
FIG. 1 illustrates an example computing system that includes a memory subsystem in accordance with some examples of the present disclosure.
Figure 1:
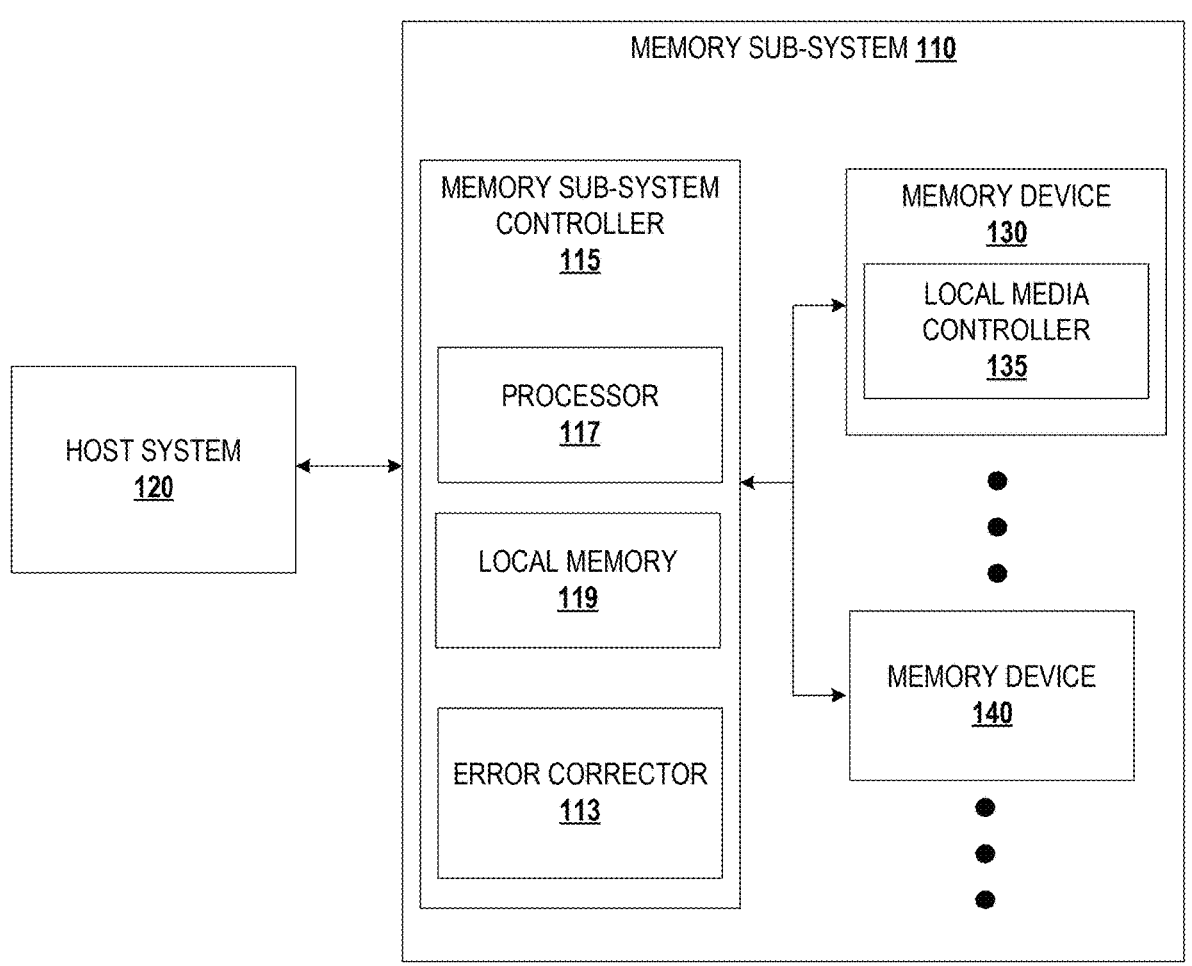

This disclosure relates to decoding read codewords from memory using a constrained bit-flipping technique. The constrained bit-flipping technique can be implemented as part of or correspond to a bit-flipping algorithm. For example, the constrained bit-flipping technique can be used according to the examples herein so that a decoder, during a first phase, operates on correcting potential errors in weak bits in read data (e.g., a read codeword) and during a second phase, if needed, operates correcting potential errors strong bits and any remaining weak bits. A weak bit refers to a bit in a current state of the codeword where there is low confidence in its accuracy based on reads from NAND, hence classified as weak. In contrast, a strong bit refers to a bit where there is high confidence in its accuracy, hence classified as strong.

By causing the decoder to focus on weak bits first, the decoder targets the bit's most likely to be erroneous, stabilizing a current state of a codeword more effectively. This early correction reduces a number of unsatisfied parity-check (PC) equations in initial iterations for weak bits, allowing the decoder to achieve a more stable and accurate codeword state before addressing less problematic bits, the strong bits. Consequently, fewer bit flips are needed in subsequent iterations, which accelerates a convergence speed of the decoder when compared to existing decoders (e.g., existing hard information decoders) that use a non-constrained bit-flipping technique. There can be bit errors on both the weak and the strong bits; however an error rate on strong bits can be lower when compared to weak bits and thus a constrained bit-flipping technique as disclosed herein can be used for correcting bit errors.

A memory sub-system refers to a storage device, a memory module or some combination thereof. The memory sub-system includes a memory device or multiple memory devices that store data. The memory-devices could be volatile or non-volatile devices. Some examples of a memory sub-system include high density non-volatile memory devices where retention of data is desired during intervals of time where no power is supplied to the memory device. One example of non-volatile memory devices is a Not-AND (NAND) memory device. A non-volatile memory device is a package that includes a die(s). Each such die can include a plane(s). For some types of non-volatile memory devices (e.g., NAND memory devices), each plane includes a set of physical blocks and each physical block includes a set of pages. Each page includes a set of memory cells, which are commonly referred to as cells. A cell is an electronic circuit that stores information. A cell stores at least one bit of binary information and has various logic states that correlate to the number of bits being stored. The logic states are represented by binary values, such as "0" and "1", or as combinations of such values, such as "00", "01", "10" and "11".

A memory device includes multiple cells arranged in a two-dimensional or a three-dimensional grid. In some examples, memory cells are formed on a silicon wafer in an array of columns connected by conductive lines (also referred to as bitlines, or BLs) and rows connected by conductive lines (also referred to as wordlines or WLs). A wordline has a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory devices.

The memory sub-system controller is configured/programmed to encode the host and other data, as part of a write operation, into a format for storage at the memory device(s). Encoding refers to a process of generating parity bits from embedded data (e.g., a sequence of binary bits) using an error correction code (ECC) and combining the parity bits to the embedded data to generate a Low Density Parity-Check (LDPC) codeword. LDPC encoding refers to an encoding method that utilizes an LDPC code to generate the parity bits, which can be referred to as a parity codeword. User data (e.g., embedded data) is combined with the parity codeword to form the LDPC codeword, which may alternatively be referred to simply as a codeword.

The LDPC code is defined by, among other things, by a sparse PC matrix, alternatively referred to as an H matrix, denoted as H. Each row of the H matrix embodies a linear constraint imposed on a designated subset of data bits. Entries within the H matrix, either "0" or "1", signify a participation of individual data bits in each constraint. Stated differently, each row of the H matrix represents a PC equation and each column corresponds to a bit in the codeword. During encoding, using the user data (embedded data) along with either the H matrix or a generator matrix (an inverse of the H matrix) parity bits are generated to provide a parity codeword. The generated parity codeword is appended to the user data to generate the codeword (LDPC codeword). Thus, the LDPC codeword includes the user data and the parity codeword, allowing for identification and rectification of errors. The LDPC codeword is storable at the memory device(s) of the memory sub-system.

Additionally, the memory sub-system controller can decode codewords, as part of a read operation, stored at the memory device(s) of the memory sub-system. Decoding refers to a process of reconstructing the original user data (e.g., sequence of binary bits embedded in the codeword) from the codeword received from storage at the memory device(s). LDPC decoding refers to a decoding method that utilizes the LDPC code to reconstruct the original user data (embedded data).

A codeword error rate (CWER) refers to a metric used to quantify a correction capability of a decoding algorithm for implementing a decoding process. Stated differently, CWER reflects the number of codewords out of a collection of codewords that have at least one bit error after the decoding process. A lower CWER implies better decoding performance and higher reliability, while a higher CWER suggests that the decoding algorithm may struggle to effectively correct errors. With respect to using hard information with the decoding algorithm, CWER is functionally dependent on a raw-bit-error-rate (RBER), which is a raw measure of bit errors occurring in an absence of any correction.

Hard information decoders are resource-efficient systems designed to correct errors in a codeword read from a memory device. These decoders employ a bit-flipping algorithm, which iteratively corrects errors by flipping bits in the read codeword based on PC violations. In some instances, this read codeword is referred to as the originally read codeword. The bit-flipping algorithm operates by evaluating the number of violated PC equations for each bit in the codeword. If the number of violations exceeds a predetermined (or selected) bit-flipping threshold for a current decoding iteration, the algorithm flips that bit. This process repeats until the codeword satisfies the PC conditions or a maximum number of iterations is reached.

A decision process of the bit-flipping algorithm, such as selection of bit-flipping thresholds for evaluation with PC violations at one or more decoding iterations, can be influenced or guided by bit-flipping criteria, also can be referred to as decision criteria or flip criteria. In some implementations, hard information decoders use matching criteria as part of the bit-flipping criteria to impact the decision-making process of the bit-flipping algorithm. The matching criteria influence the algorithm by guiding which bits are considered for flipping and whether the flipping thresholds are adjusted. The term match criteria refers to conditions used to determine whether a current state of a bit matches its originally read state from the memory device. For example, for the matching criteria, a bit's state of a current state of a codeword can be compared to a state of that bit as it was originally read from the memory device to determine whether a match or mismatch scenario exists. A match scenario occurs when the bit's current state is the same as its originally read state, whereas a mismatch scenario occurs when the bit's current state differs from the originally read state.

In some implementations, hard information decoders use bit soft information (e.g., bits that encode a strength of a bit as weak or strong) and bit state information in its bit-flipping decision process as part of the bit-flipping criteria to impact the decision-making process of the bit-flipping algorithm. The bit state information can specify a state of each bit in a current state of a codeword and in some instances can be part of the bit soft information. The bit soft information can provide a confidence level (or reliability) indicative of whether a bit is strong or weak independent of its bit value (whether 0 or 1). For example, a weak bit is a bit for which there is a low confidence or probability in that bit's value. The confidence or probability (or bit uncertainty) can be represented by an additional bit or value, such as "0" for low confidence bits and "1" for high confidence bits, or vice-versa. For example, the bit soft information can be provided in response to a read operation performed by the memory device.

For example, the memory device can perform read operations, such as hard reads (1H) and/or soft reads (1H1S, 1H2S etc). A "hard bit" in this context is a binary read of data where each bit is read and immediately interpreted as either a "0" or a "1", based on a fixed threshold, a Hard Read Position, HRP, that is based on a distribution of threshold voltages of the memory device. For example, in NAND flash memory, a voltage level above the HRP might be interpreted as "0", and below the HRP as "1". Hard reads (1H) are quick and require less computational power than soft reads (1H2S) or (1H1S).

Soft reads (1H1S, 1H2S etc.) are a combination of a hard bit and soft bits and can be used by the memory device to provide the bit soft information. The "soft bits" provide additional information about the probability or confidence level of the bit being a "0" or "1". Soft bits are generated through multiple reads at different voltage levels, referred to as soft bit read (SBR) thresholds, around the Hard Read Position, HRP, the voltage used to determine the hard bit. These additional reads with respect to the SBR thresholds help ascertain the likelihood of a state of a cell, providing a gradient of certainty rather than a binary yes/no answer. For example, if a memory cell's voltage is very close to the threshold between a "0" and a "1", the soft bits might indicate a lower confidence (low reliability) in the hard bit's value, marking it as weak. Conversely, if the voltage is far from the threshold, the soft bits would indicate higher confidence (high reliability), marking it strong. Thus, hard information decoders can use soft bit information that can be provided based on or more soft reads.

In some implementations, hard information decoders use matching criteria and the bit soft and state information in its bit-flipping decision process as part of the bit-flipping criteria to impact the decision-making process of the bit-flipping algorithm. An additional bit can be used to represent match or mismatch states (e.g., between a bit of a current state of the codeword and its corresponding bit of the originally read codeword). Thus, such hardware information decoder implementations use three bits to represent each bit's state (e.g., with either a "0" or "1"), whether that bit is considered weak or strong (e.g., with either a "0" or "1"), and whether that bit matches it corresponding bit in the originally read codeword (e.g., with either a "0" or "1").

Hard information decoders utilize corresponding bit-flipping criteria, such as disclosed herein, to influence a selection or identification of bit-flipping thresholds in a bit-flipping decision process (the bit-flipping algorithm) during one or more decoding iterations. This process can be implemented as a part of a bit-flipping algorithm. For example, in some instances, a hard information decoder can identify for each bit in a current state of the codeword at a respective decoding iteration a bit-flipping threshold from a set of two-bit-flipping thresholds for that iteration. A first bit-flipping threshold can be used for weak bits (bits identified as weak) and a second bit-flipping threshold can be used for strong bits (bits identified as strong).

In other instances, the hard information decoder can identify for each bit in a current state of the codeword a bit-flipping threshold from a set of four-bit-flipping thresholds. For example, a first bit-flipping threshold can be used for bits having a match state and classified as weak (known as a weak bit), a second bit-flipping threshold can be used for bits having a mismatch state and classified as weak (known as a weak bit), a third bit-flipping threshold can be used for bits having a match state and classified as strong, and a fourth bit-flipping threshold can be used for bits having a mismatch state and classified as strong.

Bit-flipping thresholds used by the hard information decoder during one or more decoding iterations can be optimized offline using a machine learning (ML) iterative algorithm. This optimization process can determine optimal bit-flipping thresholds by simulating decoding scenarios that consider the bit-flipping criteria. The optimized bit-flipping thresholds can be selected based on a cost metric such as CWER or an average iteration count (avglter). CWER measures a proportion of codewords that remain erroneous after decoding, while avglter tracks a number of iterations required to successfully decode a codeword and a CWER measure can be translated into a decode time which impacts decoder throughput. Once determined, the optimized bit-flipping thresholds are applied by the hard information decoder during the decoding process.

For example, during or before the decoding process, the hard information decoder initializes the H matrix (PC matrix) to establish which bits (columns) are connected to which nodes (rows). Each row of the H matrix corresponds to a PC equation, and each column corresponds to a bit in the current state of the codeword. A "1" in the H matrix indicates that the corresponding bit is included in that parity check; a "0" indicates that it is not. Thus, each bit in the current state of the codeword is represented by a column in the H matrix. For example, during one or more decoding iterations, the hard information decoder for each bit (each column in the H matrix) checks how many unsatisfied PC equations that bit is involved in (e.g., how many unsatisfied check nodes that bit is connected to) to compute PC violations for that bit (if any).

In some examples, the hard information decoder uses the soft and bit information to select (identify) one of the first and second bit-flipping thresholds for PC evaluation. The hard information decoder compares the selected first or second bit-flipping threshold for each bit of the current state of the codeword against its computed PC violation to determine whether that bit should be flipped at one or more decoding iterations. For example, if a selected bit-flipping threshold for a bit in the current state of the codeword exceeds the PC violation for the bit that bit can be flipped. In other examples, the hard information decoder uses the soft and bit information and the matching criteria to select one of the first, second, third, and fourth bit-flipping thresholds, as described herein, for bit flip determination.

Accordingly, during one or more decoding iterations, the hard information decoder evaluates all bits in the current state of the codeword, including hard and soft bits. If multiple bits meet corresponding bit-flipping criteria, all such bits are flipped in the same iteration, regardless of if those bits are classified (identified) hard or soft. Flipping a bit toggles its binary state (from 0 to 1 or from 1 to 0), which updates the current state of the codeword. This change impacts subsequent evaluations of the H matrix by altering the PC equations associated with the flipped bits. As a result, some previously unsatisfied checks can become satisfied, and vice versa, potentially reducing a total number of unsatisfied PC equations. This iterative process continues, with the hard information decoder recalculating PC violations and re-evaluating bit-flipping criteria at one or more decoding iterations until all PC violations are satisfied or a maximum number of iterations is reached.

According to examples herein, a decoder is disclosed that uses a constrained bit-flipping technique that targets weak bits over strong bits of codeword for an X number of (initial) decoding iterations of a Z number of decoding iterations defined or established for the decoder. During the first X decoding iterations, the decoder may not process bits marked as strong and process one or more bits marked as weak. Strong bits are assumed to be more likely correct so initially processing these bits can be skipped during the first Z decoding iterations. The disclosed decoder presents decreased latency because processing time will not be spent at the strong bits during the first Z decoding iterations. The constrained bit-flipping technique can be implemented, in some instances, as part of a bit-flipping algorithm of the decoder. The technique of the present disclosure aims to correct potential errors in more unreliable bits early on. In some examples, the decoder can be referred to as a reliability enabled hard information decoder because the decoder uses soft information, such as binary soft information. After X iterations, if errors still remain in the codeword, the decoder is configured to process strong bits over the next Y iterations (remaining decoding iterations of the Z decoding iterations), while continuing to handle any remaining weak bits that were not corrected during the initial phase. The values X and Y for the number of decoding iterations can represent integer values and can be optimized based on simulations.

Thus, by focusing on weak bits first, the decoder targets the bit's most likely to be erroneous, stabilizing a current state of a codeword more effectively and avoiding spending processing time in bits likely to be already correct. This early correction reduces a number of unsatisfied PC equations in initial iterations for weak bits, allowing the decoder to achieve a more stable and accurate codeword state before addressing less problematic bits, the strong bits. Consequently, fewer bits are compared against associated number of unsatisfied check nodes in subsequent iterations, which accelerates a convergence speed of the decoder when compared to existing decoders (e.g., existing hard information decoders) that do not use the constrained bit-flipping technique of the present disclosure.

For example, a controller can be configured with the constrained bit-flipping technique for a decoding process that includes two-decoding phases: an initial decoding phase during which the controller works on decoding weak bits based on weak bit-flipping thresholds, and a second phase (if needed) during which the controller works on decoding any strong bits and remaining weak bits from the initial decoding phase using weak and/or strong bit-flipping thresholds.

For example, after a read operation such as a soft read at a memory device (e.g., NAND memory device), the controller receives bit soft information for a read codeword (e.g., an originally read codeword). In some examples, the codeword can be provided using the soft read. During the initial phase, the controller identifies weak bits using the bit soft information. The bit soft information can provide a confidence level (or reliability) indicative of whether a bit is strong or weak independent of its bit value (whether 0 or 1). The decoder applies (uses) weak bit-flipping thresholds for multiple decoding iterations of the initial decoding phase to potentially correct errors in the identified weak bits, without spending time processing strong bits. The weak bit-flipping thresholds can be optimized by a bit-flipping threshold optimizer (e.g., offline) to enhance the error correction efficiency of the decoder.

In some examples, if, after a predefined number of iterations, the weak bits are corrected and no strong bit errors are present, the decoding process concludes, and a corrected codeword is provided. In some examples, if the codeword still contains errors, such as strong bit errors and one or more weak bit errors that had not been corrected during the initial phase, the controller during the second phase works on the strong bits and any remaining weak bits. During the second phase, the decoder uses strong and/or weak bit-flipping thresholds to maximize error correction. The strong and weak bit-flipping thresholds used during the second phase can be optimized by the bit-flipping threshold optimizer (e.g., offline) to enhance the error correction efficiency of the decoder. The decoder continues iterating until all errors are corrected or a maximum number of decoding iterations have been reached. If the codeword is successfully decoded, the corrected codeword is generated; otherwise, a recovery mechanism is employed to provide the corrected codeword.

FIG. 1 illustrates an example computing system 100 that includes a memory subsystem 110 in accordance with some examples of the present disclosure. The memory subsystem 110 can include media, such as one or more volatile memory devices (e.g., memory device 140), one or more non-volatile memory devices (e.g., memory device 130), or a combination of such. The memory sub-system 110 can be a storage device, a memory module or a hybrid of a storage device and a memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller) and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface, or any other interface.

The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., a PCIe or CXL bus). The physical host interface can provide an interface for passing control, address, data and other signals between the memory sub-system 110 and the host system 120. FIG. 1 illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include NAND type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

In some examples, a non-volatile memory device is a package of one or more dies. The dies in the packages can be assigned to one or more channels for communicating with the controller 115. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Each of the memory device(s) 130 include one or more arrays of memory cells. One type of memory cell, for example, single level cells (SLC) can store one bit per cell. Other types of memory cells, such as multi-level cells (MLCs), triple level cells (TLCs), quad-level cells (QLCs) and penta-level cells (PLC's) or higher, can store multiple bits per cell. In some examples, each of the memory devices 130 can include one or more arrays of memory cells such as SLCs, MLCs, TLCs, QLCs, PLCs or some combination thereof. In some examples, a particular memory device can include an SLC portion, an MLC portion, a TLC portion, a QLC portion and/or a PLC portion of memory cells. Depending on a cell type, a cell can store one or more bits of binary information and has various logic states that correlate to a number of bits being stored. The logic states can be represented by binary values, such as "0" and "1", or combinations of such values. The memory cells of the memory devices 130 can be grouped as pages that can refer to a logical unit of the memory device used to store data. In some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-OR (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory devices 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and ECC operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

The memory device 130 and the memory device 140 are structured to include wordlines. Wordlines are addressable wiring lines that connect and control a row of memory cells in the memory device 130 and the memory device 140. Each wordline addresses the cells in a corresponding row contemporaneously, enabling operations such as reading, writing and erasing data. The memory device 130 and the memory device 140 can be organized into an array of cells arranged in blocks, with each block containing multiple pages. The cells in a page are connected by these wordlines horizontally and bitlines vertically, forming a grid-like structure that allows for efficient data access and management.

In some examples, the memory sub-system 110 includes an error-corrector 113 that executes an error-handling of data read from the memory device 130 and/or the memory device 140. In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these requests for reading and/or writing data by interacting with the memory sub-system 110, managing the flow of data to and from the memory device 130 and/or the memory device 140 within the memory sub-system 110. This reading and writing of data enables operation of computing systems where data access and management is needed.

Figure 2:
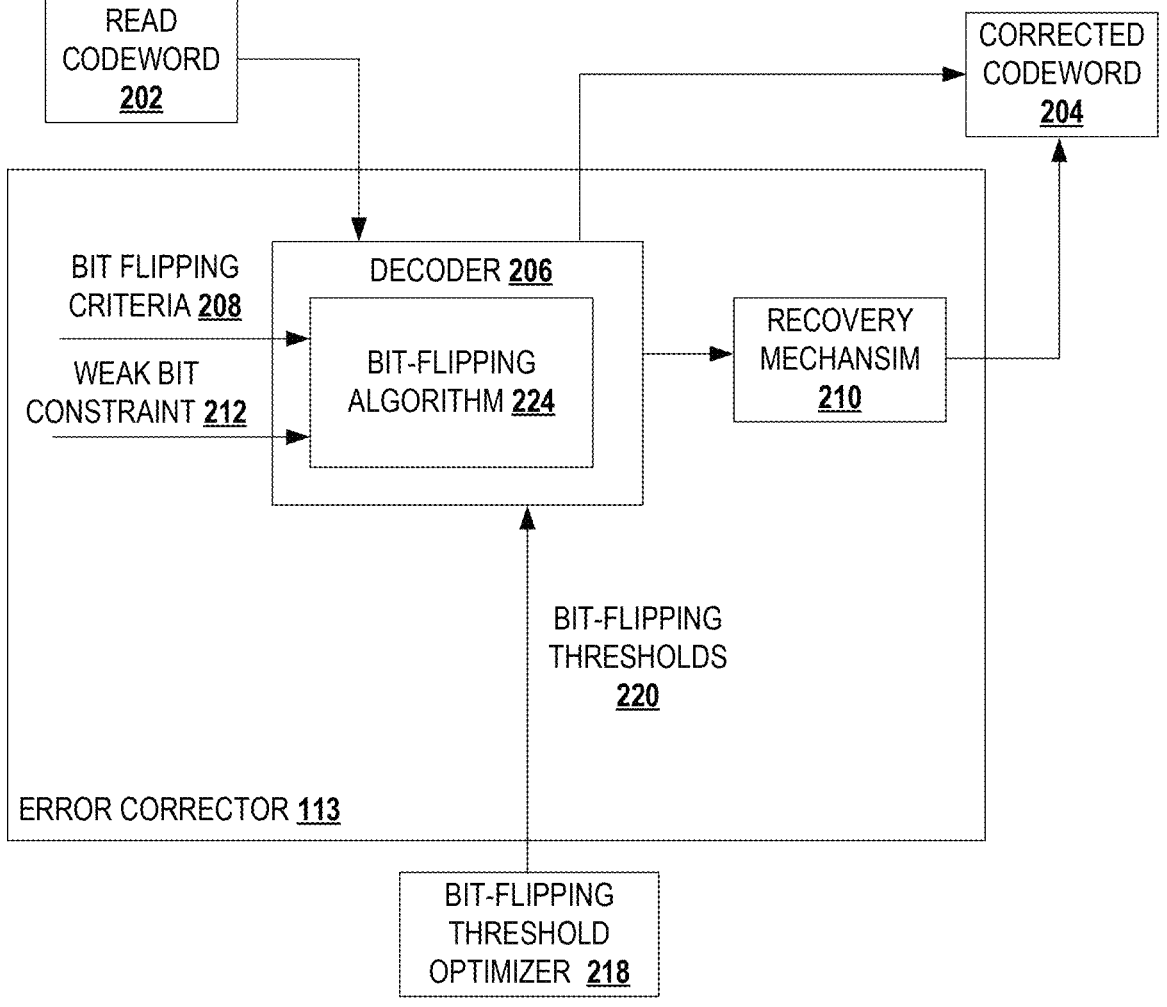
FIG. 2 illustrates an error corrector of a memory sub-system of the computing system of FIG. 1.

For example, in some instances, the controller 115 can retrieve or receive a codeword from the memory device 130 or the memory device 140. The controller 115 may retrieve the codeword in response to a read command from the host system 120. This read command typically corresponds to a request for specific data stored within the memory sub-system 110. For example, the controller 115 can retrieve the codeword from a NAND memory device, which can be represented by the memory device 130 or the memory device 140. The controller 115 can perform a read operation, such as a NAND read operation. During this process, the controller 115 accesses a block of memory cells in the memory device 130 or memory device 140, where the requested data (stored as a codeword) resides. The data is stored in the form of a codeword, which includes both the original data and additional parity bits used for error correction. A read codeword from the memory device 130 or the memory device 140 is referred to as a read codeword 202, as illustrated in FIG. 2. In some instances, the read codeword 202 is referred to as an originally read codeword. These parity bits are generated during an encoding process of the original data, using an ECC such as LDPC codes and are stored alongside the original data in the memory device 130 or the memory device 140. Parity bits are additional bits added to the original data to help detect and correct errors.

FIG. 2 illustrates an example of the error corrector 113 of FIG. 1. The error corrector 113 can be implemented using one or more modules, shown in block form in the drawings. The one or more modules can be in software or hardware form, or a combination thereof. In some examples, one or more functions of the error corrector 113 can be implemented as machine readable instructions for execution by the controller 115, as shown in FIG. 1.

For example, the memory device 130 or the memory device 140 can perform a hard read by applying a fixed threshold to determine a state of each bit stored in the block of the memory cells to provide the hard data. For instance, if a voltage level read from a cell in the memory device 130 or the memory device 140 storing the bit is above a certain threshold, it can be interpreted as 0; if below, as 1. The hard data is considered "hard" because it represents an uncorrected output from the memory cells, as opposed to "soft" data, which can include additional information (e.g., a confidence level or likelihood of a bit being correct) corresponding to bit soft information, as described herein.

For example, the bit soft information can be generated from a combination of hard reads and soft reads, such as "1H1S" or "1H2S" configurations. The "hard bit" (1H) refers to a binary read where each bit is immediately interpreted as either "0" or "1" based on the fixed threshold to provide the hard data. While hard reads are quick and require less computational power, they provide limited information about the reliability of the bit. The "soft bits" (1S or 2S) offer additional information regarding a confidence level of the bit being "0" or "1". This additional information can be represented with binary values to indicate a confidence of whether that bit is a "1" or a "0".

Soft bits are generated through multiple reads by the memory device 130 or 140 at different voltage levels, referred to as soft bit read (SBR) thresholds, around the Hard Read Position, HRP, the voltage used to determine the hard bit. These additional reads with respect to the SBR thresholds help ascertain the likelihood of a state of a cell, providing a gradient of certainty rather than a binary yes/no answer. For example, if a memory cell's voltage is very close to the threshold between a "0" and a "1", the soft bits might indicate a lower confidence (low reliability) in the hard bit's value, marking it as weak. Conversely, if the voltage is far from the threshold, the soft bits would indicate higher confidence (high reliability), marking it strong.

After retrieving or receiving the read codeword 202, the controller 115 can use the error corrector 113 to process the read codeword 202 and correct any errors to provide a corrected codeword 204, for example, using a bit-flipping algorithm 224, which in some instances can include the bit-flipping technique, as described herein. In some examples, the read codeword 202 is referred to as read data and the corrected codeword 204 is referred to as corrected data. By way of example, if the data stored in the memory cells is subject to noise or degradation, one or more bits of the read codeword may be incorrect. The error corrector 113 applies a decoding algorithm implemented by (or corresponding to) the decoder 206 to the read codeword 202 to correct any errors and reconstruct the original data (sometimes referred to as user data) according to one or more examples herein.

In some examples, the bit-flipping algorithm 224 is implemented as part of the decoding algorithm. In some examples, the decoder 206 is referred to as a reliability enabled soft information decoder because the decoder uses soft information to influence its bit-decision flipping process. The controller 115 can extract the original data from the corrected codeword 204 and provide it as requested data to the host system 120. According to one or more examples herein, during its decoding process, the error corrector 113 can prioritize weak bits for X decoding iterations in its bit-decision flipping process to correct bit errors in those weak bits.

In some examples, to decode the read codeword 202, the error corrector 113 can receive a weak bit constraint 212. The weak bit constraint 212 causes the bit-flipping algorithm 224 of the decoder 206 to use or implement the constrained bit-flipping technique. The constrained bit-flipping technique causes the decoder 206 to focus on weak bits for X decoding iterations (or an initial subset of decoding iterations of a set of Y decoding iterations of a decoding process) to correct errors in those bits. The weak bit constraint 212 can specify a set of X decoding iterations, which can range from about 3 to about 5 iterations. The error corrector 113 (the bit-flipping algorithm 224) can use bit-flipping criteria 208 in its bit-flipping decision process (or logic).

In some examples, the bit-flipping criteria 208 can include bit soft information and bit state information. This information can be represented using binary values, with two bits representing various combinations of soft and bit states. The bit state information can specify a state of each bit in a current state of a codeword and in some instances can be part of the bit soft information. The bit soft information can provide a confidence level (or reliability) indicative of whether a bit is strong or weak independent of its bit value (whether 0 or 1). A weak bit refers to a bit in a current state of the codeword where there is low confidence in its accuracy, hence classified as weak. In contrast, a strong bit refers to a bit where there is high confidence in its accuracy, hence classified as strong. In some examples, the bit-flipping criteria 208 can also include matching criteria, which indicate whether the current state of each bit matches the originally read bit. This can be used to classify each bit into a match or mismatch state, that is, indicate whether each bit of the current state of the codeword matches or does not match a corresponding bit of the read codeword 202.

The decoder 206 uses the bit-flipping criteria 208 to select or identify a bit-flipping threshold from a set of bit-flipping thresholds 220 during one or more decoding iterations for determining whether bits of the current state of the codeword should or should not be flipped. In some examples, the set of bit-flipping thresholds 220 are also referred to as PC violation thresholds. In some examples, referred to herein as a first example, the set of bit-flipping thresholds 220 can include a first bit-flipping threshold that can be used for a weak bit (a bit identified as weak by the bit soft information) and a second bit-flipping threshold that can be used a strong bit (a bit identified as strong by the bit soft information) for one or more decoding iterations.

In some examples, referred to herein as a second example, the set of bit-flipping thresholds 220 can include a first bit-flipping threshold that can be used for a bit having a match state and classified (or identified) as weak (known as a weak bit), a second bit-flipping threshold that can be used for a bit having a mismatch state and classified as strong (known as a strong bit), a third bit-flipping threshold that can be used for a bit having a match state and classified as strong, and a third bit-flipping threshold that can be used for a bit having a mismatch state and classified as strong in the one or more decoding iterations.

In some examples, a bit-flipping threshold optimizer 218 can be used to determine the set of bit-flipping thresholds 220 that can be used by the decoder 206 during decoding iterations based on an optimization process. The set of bit-flipping thresholds 220 can be optimized using a machine learning iterative algorithm (e.g., a trained machine learning model). This optimization process, can be conducted as an offline procedure, and can involve running simulations where the performance of different bit-flipping thresholds is evaluated (e.g., for a simulated system, such as the system 100 of FIG. 1) based on specific cost metrics, such as CWER and average avglter.

During the optimization process, the machine learning algorithm iteratively adjusts bit-flipping thresholds, learning from simulated outcomes to identify most effective bit-flipping thresholds for minimizing errors and improving decoding efficiency. The machine learning algorithm can evaluate a range of possible bit-flipping thresholds, testing an impact a bit-flipping threshold has on the decoding process, and gradually converges on an optimal set of bit-flipping thresholds corresponding to the set of bit-flipping thresholds 220, as illustrated in FIG. 2. Once the set of bit-flipping thresholds 220 are identified, the set of bit-flipping thresholds 220 can be used by the bit-flipping algorithm 224. Different subset of bit-flipping thresholds from the set of bit-flipping thresholds 220 can be used by the decoder 206 for one or more decoding iterations of the decoding process.

In some examples, the selection of bit-flipping thresholds by the decoder 206 can be constrained by the weak bit constraint 212, causing the decoder 206 to use one or more bit-flipping thresholds of the set of bit-flipping thresholds 220 for weak bits, which can be referred to as weak bit-flipping thresholds. By contrast, one or more bit-flipping thresholds of the set of bit-flipping thresholds 220 used for strong bits can be referred to as strong bit-flipping thresholds. In the first example, the decoder 206 (the bit-flipping algorithm 224) uses the first bit-flipping threshold for weak bits during the X decoding iterations. In the second example, the decoder 206 can use both the first and second bit-flipping thresholds from a subset of four bit-flipping thresholds, such as described herein, for weak bits during the X decoding iterations.

For example, during or before the decoding process, the decoder 206 initializes an H matrix (PC matrix) to establish connections between bits (columns) of the current state of the codeword and check nodes (rows). The controller 115 can execute a first decoding operation using the decoder 206 to correct a bit error in one or more weak bits of the read codeword 202. During one or more decoding iterations of the first decoding operation, the decoder 206 can check how many unsatisfied PC equations each bit is involved in to compute PC violations for those bits. In the first example, the decoder 206 uses the soft and bit state information to select one of the first and second bit-flipping thresholds of the set of bit-flipping thresholds 220 for evaluation against the computed PC violation for each bit. The decoder 206 then compares the selected bit-flipping threshold with the PC violation to determine whether that bit should be flipped in that iteration. If the PC violation exceeds the selected bit-flipping threshold, the bit is flipped. In the second example, the decoder 206 uses the soft and bit state information and the matching criteria to select from four sets of bit-flipping thresholds for evaluation with the computed PC violations.

Because the decoder 206 is constrained (e.g., by the weak bit constraint 212) to process weak bits first for X decoding iterations of the first decoding operation, it computes PC violations specifically for weak bits during these decoding iterations. Thus, decreasing latency. This is because the weak bit constraint 212 causes the controller 115 in the first decoding operation to correct a bit error in one or more unreliable bits of the read codeword 202 corresponding to the one or more weak bits while ignoring more reliable bits of the data corresponding to the strong bits of the data.

During the first decoding operation, the decoder 206 compares the computed PC violations to a corresponding identified (or selected) weak bit-flipping threshold to decide if a weak bit (a bit for which the bit soft information indicates that the bit is weak) should be flipped. The weak bit is flipped if its PC violation exceeds the corresponding weak bit-flipping threshold. After completing the X decoding iterations, the decoder 206 can transition to using weak and/or strong bit-flipping thresholds from the set of bit-flipping thresholds 220 over Y decoding iterations, if errors in a current state of the codeword are still present. Thus, the decoder 206 executes a second decoding operation to correct a bit error in one or more strong bits of the current state of the codeword and any remaining weak bits in the current state of the codeword that had not been corrected by the decoder 206 during the first decoding operation.

For example, the decoder 206 can perform a check at an end of the X decoding iterations to assess a number of unsatisfied PC equations. If any PC equations remain unsatisfied, indicating that errors persist in the current state of the codeword, the decoder 206 then executes the second decoding operation. For the second decoding operations, weak and/or strong bit-flipping thresholds of the set of bit-flipping thresholds 218 are used to continue correcting the remaining errors starting with the current state of the codeword from the first decoding operation. The decoding process continues over the Y decoding iterations until a stop condition is met. The stop condition can be satisfied if the decoder 206 successfully decodes the read codeword 202 to provide the corrected codeword 204 or after Y decoding iterations are completed.

During the Y decoding iterations, the decoder 206 can evaluate strong bits and any remaining weak bits that were not corrected during the initial X decoding iterations. For both strong bits and any remaining weak bits in the current state of a codeword at a respective decoding iteration of the Y decoding iterations, the decoder 206 computes PC violations for each bit of the current state of the codeword and compares the computed PC violations against selected bit-flipping thresholds identified from the set of bit-flipping thresholds 220 to determine if these bits should be flipped. The selected bit-flipping thresholds can include, in some instances, only strong bit-flipping thresholds as all weak bits have been corrected during the initial X iterations. In other examples, the selected bit-flipping thresholds can include strong bit-flipping thresholds and weak-bit-flipping thresholds, such as in scenarios in which uncorrected weak bits remain from the initial X decoding iterations.

This two-phase approach implemented at the decoder 206, prioritizing weak bits first and then addressing strong bits (and any remaining weak bits), allows the decoder 206 to improve convergence speed and latency of the decoder 206 by reducing the number of bits processed in an iteration when compared to other decoders such as hard information decoders that do not use the constrained bit-flipping technique, as described herein. By addressing potential errors in weak bits first, the decoder 206 processes and potentially corrects more unreliable bits early on, thereby enhancing an overall accuracy and stability of the decoding process.

In some examples, the decoder 206 monitors the progress of the second decoding operation by tracking a current iteration number of the Y decoding iterations. The controller 115 can compare the current iteration number to a predefined iteration threshold. The iteration threshold can be set to be less than a total number of Y iterations but greater than a total number of X iterations. If the current iteration number exceeds the predefined iteration threshold, it may indicate that the decoder 206 is in a stuck condition, for example, oscillating, where bits are repeatedly flipped without resolving the errors. To address this, the decoder 206 can switch back to flipping only weak bits rather than both weak and strong bits. Thus, this action triggers a third decoding operation at the decoder 206 and the decoder 206 decodes once again for X decoding iterations (referred to as subsequent X decoding iterations) focusing on the weak bits of the current state of the codeword. By concentrating on weak bits, which are more prone to errors, the decoder 206 aims to break out of the oscillation and make progress towards convergence (the corrected codeword 204). The third decoding operation can begin with the current state of the codeword at the specific decoding iteration where the predefined iteration threshold was exceeded. The decoder 206 can use the weak-bit-flipping thresholds from the bit-flipping thresholds 220 that it used during an initial number of X decoding iterations in its subsequent X decoding iterations to selectively flip weak bits. In some examples, the controller 115 can initiate a fourth decoding operation, same or similar to approach of the second decoding operation, to address any remaining errors using weak and/or strong bit-flipping thresholds for an additional set of Y decoding iterations in a same or similar manner as described herein.

In some examples, the decoder 206 is unable to fully correct the read codeword 202 in response to a second stop condition. For example, the decoder 206 satisfies the second stop condition by completing Y decoding iterations but the read codeword 202 has not been fully (or completely) corrected by the decoder 206. In some examples, the error corrector 113 implements a recovery mechanism 210 in response to the decoder 206 failing to decode the read codeword 202, or in response to the second stop condition. In an example, the recovery mechanism 210 can include a soft information decoder, which can be used by the decoder 206 to decode the read codeword 202 to potentially provide an error free codeword, the corrected codeword 204. The soft information decoder can be a more resource-intensive decoder compared to the decoder 206 (a reliability enabled hard information decoder). This is due to the soft information decoder utilizing more internal decoder hardware resources and implementing a more advanced decoding algorithm, such as an iterative message-passing algorithm, when compared to a bit-flipping algorithm. Example iterative message-passing algorithms can include a Min-Sum Algorithm (MSA).

In some examples, if the soft information decoder fails or the decoder 206 fails to correct the read codeword 202 (after the decoder 206 failed as well), the error corrector 113 can trigger a retransmission request (e.g., read operation, such as NAND read operation), prompting the memory device 130 or memory device 140 to resend the stored codeword. A retransmission request refers to a process where the controller 115 requests the memory device 130 or the memory device 140 to re-read the stored data from the memory cells. The controller 115 can transmit a request for the memory device 130 or the memory device 140 to-read stored data from memory cells to provide an updated read codeword Thus, the controller 115 can instruct memory device 130 or the memory device 140 to perform another read operation on the specific memory cells containing the codeword to receive the updated read codeword. Once the updated read codeword is received, the controller 115 can decode the updated read codeword according to one or more examples herein to provide the corrected codeword 204.

Figure 3:
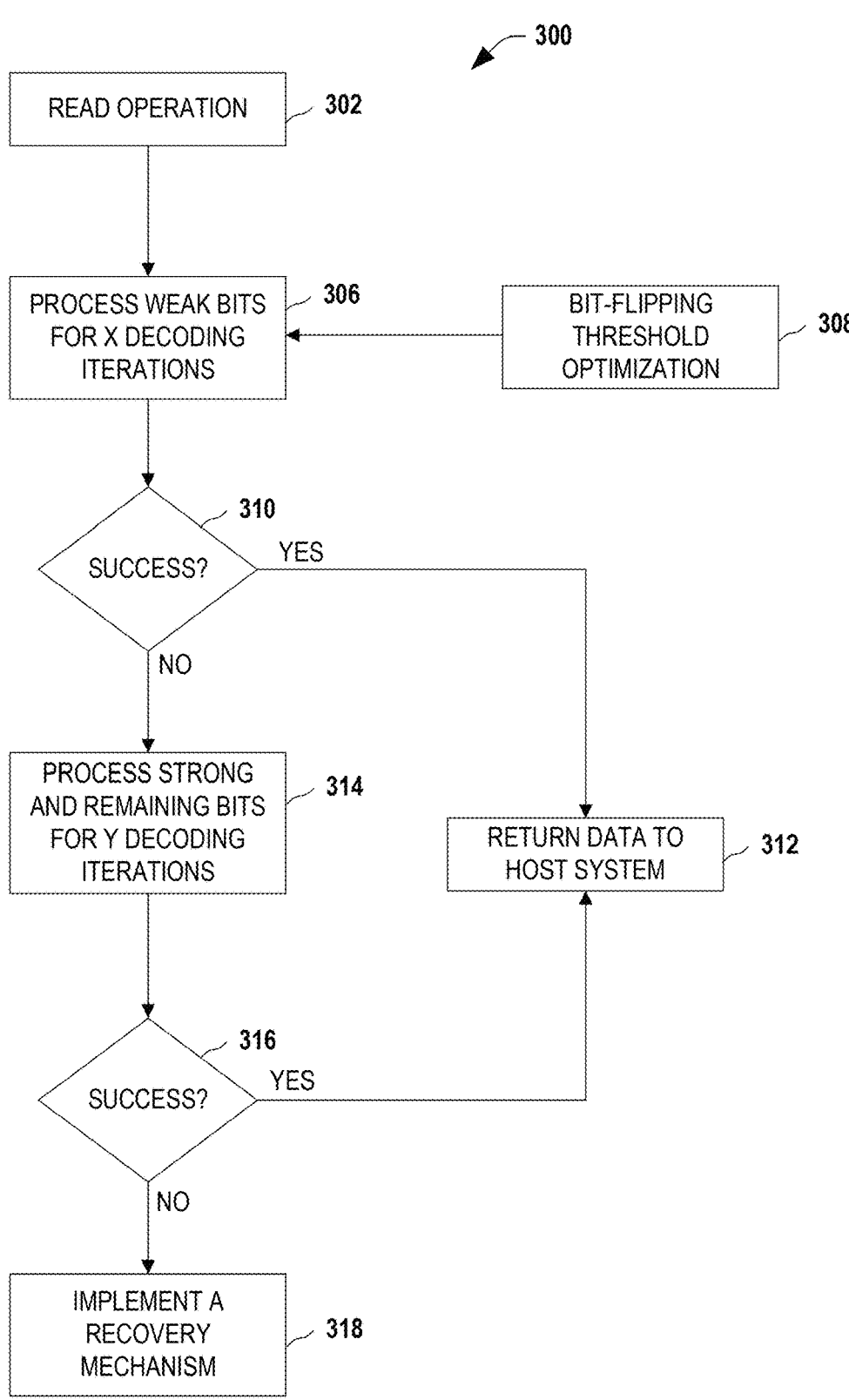
FIG. 3 illustrates a flowchart of an example method for decoding a codeword.

FIG. 3 illustrates a flowchart of an example method 300 for decoding the read codeword 202 according to one or more examples of the present disclosure. The method 300 can be implemented, for example, by a controller, such as the memory sub-system controller 115 of FIG. 1. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 300 is performed by the error corrector 113 of FIGS. 1-2. Although shown in a particular sequence or order, unless otherwise specified, the order of the processes can be modified. Thus, the illustrated examples should be understood only as examples and the illustrated processes can be performed in a different order and some processes can be performed in parallel. Additionally, one or more processes can be omitted in various examples.

At block 302, the controller 115 can perform a read operation, such as a NAND read operation to receive data codeword, the read codeword 202. In some examples, the read operation includes a soft read and/or a hard read according to one or more examples as described herein. Thus, the controller 115 can receive bit soft information from the memory device 130 or the memory device 140. At block 306, the controller 115 uses the decoder 206 to decode the read codeword 202 for X decoding iterations to correct one or more bits of the read codeword 202 that are weak, referred to as weak bits, using one or more weak bit-flipping thresholds from the set of bit-flipping thresholds 220.

In some examples, at block 308, the set of bit-flipping thresholds 220, including strong and weak bit-flipping thresholds, can be provided by the bit-flipping threshold optimizer 218 of FIG. 2 according to one or more examples as described herein. Thus, at block 308, the one or more weak bit-flipping thresholds used by the decoder 206 during the X decoding iterations to correct one or more weak bits in a current state of a codeword can be optimized by the bit-flipping threshold optimizer 218.

At block 310, the controller 115 determines if the read codeword 202 was successfully decoded to provide the corrected codeword 204 in response to a first stop condition corresponding to completing the X decoding iterations. If the read codeword 202 was successfully decoded (shown as "YES" in FIG. 3), the decoder 206 provides the corrected codeword 204, and the method 300 proceeds to block 312 from block 310. Thus, in some examples, after processing the weak bits for X decoding iterations, the decoder 206 may correct all errors in the read codeword 202 to provide the corrected codeword 204. At block 312, the controller 115 provides data embedded in the corrected codeword 204, referred to as requested or user data, for example, after being extracted, to the host system 120 of FIG. 1.

In some examples, if the read codeword 202 was not successfully decoded (shown as "NO" in FIG. 3), the method 300 proceeds to block 314 from block 310. At block 314, the controller 115 uses the decoder 206 to decode a current state of the codeword (following the Y decoding iterations to correct strong bits any remaining weak bits in the current state of codeword that were not corrected by the decoder 206 initially based on the set of bit-flipping thresholds 220.

At block 314, for one or more decoding iterations of the Y decoding iterations, the decoder 206 can use strong and/or soft bit-flipping thresholds of the set of bit-flipping thresholds 220. In some instances, one or more strong bit-flipping thresholds of the set of bit-flipping thresholds 220 are used only as all weak bits were corrected by the decoder 206 in response to the X decoding iterations. In other examples, one or more weak bits remain after the X decoding iterations, and, at block 314, the decoder 206 uses corresponding strong and weak bit-flipping thresholds from the bit-flipping thresholds 220, which can be identified based on the bit-flipping criteria 208. The decoder 206 iteratively decodes over the Y decoding iterations until a second stop condition is met (e.g., all check nodes are satisfied or a maximum number of Y decoding iterations have been reached).

At block 316, the controller 115 determines if the read codeword 202 was successfully decoded to provide the corrected codeword 204 in response to the second stop condition. If the read codeword 202 was successfully decoded (shown as "YES" in FIG. 3) in response to the second stop condition, the method 300 proceeds to block 312 from block 316. At block 312, the controller 115 provides the user data or the requested data from the corrected codeword 204 to the host system 120 of FIG. 1. In some instances, if the read codeword 202 was not successfully decoded (shown as "NO" in FIG. 3) in response to the second stop condition, the method 300 proceeds to block 318. At block 318, the controller 115 implements a recovery mechanism, such as the recovery mechanism 210 of FIG. 2 according to one or more examples described herein to potentially provide the corrected codeword 204.

Figure 4:
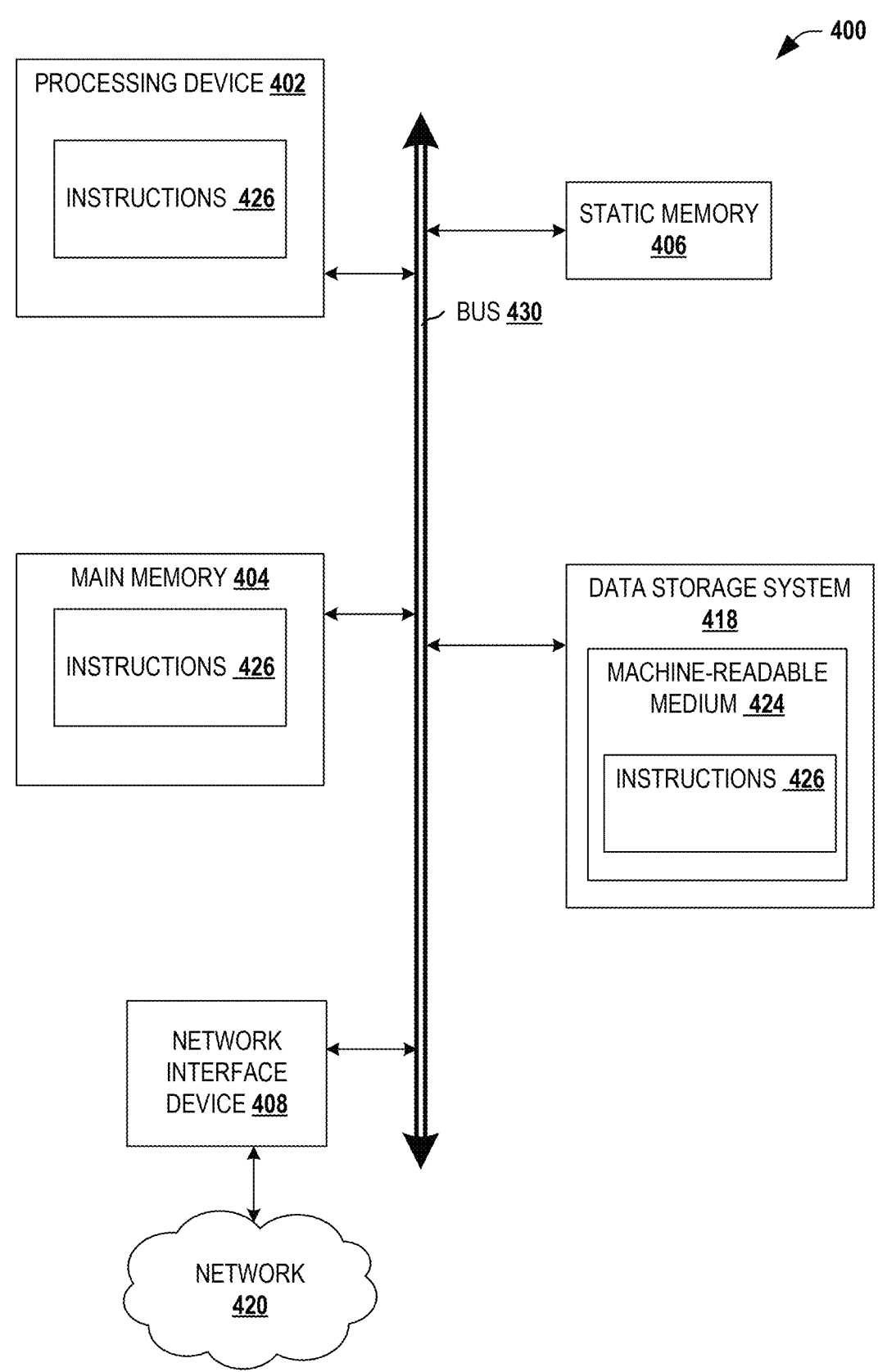
FIG. 4 illustrates an example of a computer system (a machine) in which examples of the present description may operate.

FIG. 4 illustrates an example machine of a computer system 400 (a machine) within which a set of instructions, for causing the machine to perform any one or more of the methodologies discussed herein, can be executed. In some examples, the computer system 400 corresponds to a host system (e.g., the host system 120 of FIG. 1) that includes, is coupled to, or utilizes a memory sub-system (e.g., the memory sub-system 110 of FIG. 1) or is used to perform the operations of a controller (e.g., to execute an operating system to perform operations corresponding to error corrector 113 of FIG. 1). In other examples, the machine is connected (e.g., networked) to other machines in a LAN, an intranet, an extranet and/or the Internet. In various examples, the machine operates in the capacity of a server or a client machine in client-server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automotive, a data center, a smart factory or other industrial application. Further, while a single machine is illustrated, the term "machine" shall also be taken to include any collection of machines that individually or jointly execute a set (or multiple sets) of instructions to perform the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM) or other non-transitory computer-readable media) and a data storage system 418, which communicate with each other via a bus 430.

The processing device 402 represents one or more general-purpose processing devices such as a microprocessor, a central processing unit, etc. More particularly, the processing device 402 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 402 is implemented with a special-purpose processing devices such as an application specific integrated circuit (ASIC), a field programmable gate array (FPGA), a digital signal processor (DSP), network processor, etc. The processing device 402 is configured to execute instructions 426 for performing the operations discussed herein. In some examples, the computer system 400 includes a network interface device 408 to communicate over the network 420.

The data storage system 418 includes a machine-readable storage medium 424 (also known as a computer-readable medium) that store sets of instructions 426 or software for executing the methodologies and/or functions described herein. The machine-readable storage medium 424 is a non-transitory medium. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418 and/or main memory 404 can correspond to the memory sub-system 110 of FIG. 1. Accordingly, the machine-readable storage medium 424, the data storage system 418 and/or the main memory 404 are examples of non-transitory computer-readable media.

In some examples, the instructions 426 include instructions to implement functionality corresponding to the error corrector 113 of FIG. 1. While the machine-readable storage medium 424 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for decoding data in a memory device, comprising:

performing, by a controller, a read operation to receive the data from the memory device;

executing, by the controller, a first decoding operation to correct a bit error in one or more weak bits of the data;

determining, by the controller, whether any bit errors remain in the data in response to the execution of the first decoding operation;

executing, by the controller, a second decoding operation to correct a bit error in one or more strong bits of the data and any remaining weak bits in the data that had not been corrected by the decoder by the first decoding operation in response to determining the data has errors; and providing, by the controller, corrected data in response to correcting errors in the data.

2. The method of claim 1, wherein the first decoding operation is implemented based on a weak bit constraint that causes the controller in the first decoding operation to correct a bit error in one or more unreliable bits of the data corresponding to the one or more weak bits while ignoring more reliable bits of the data corresponding to the strong bits of the data.

3. The method of claim 1, wherein during the first decoding operation the controller uses weak bit-flipping thresholds from a set of bit-flipping thresholds to correct the errors in the data, and during the second decoding operation the controller uses strong, weak, or a combination of weak and strong bit-flipping thresholds from the set of bit-flipping thresholds to correct the errors in the data.

4. The method of claim 1, wherein the set of bit-flipping thresholds corresponds to a set of optimized bit-flipping thresholds determined by a bit-flipping threshold optimizer.

5. The method of claim 4, wherein the bit-flipping threshold optimizer provides the set of optimized bit-flipping thresholds using an optimization process that is implemented offline.

6. The method of claim 1, wherein the data is a codeword, the determining comprises evaluating, by the controller, a current state of the codeword to determine whether any bit errors are present in the current state of the codeword in response to the first decoding operation.

7. The method of claim 1, further comprising determining, by the controller, whether any bit errors are present in the data in response to the second decoding operation.

8. The method of claim 7, wherein the data is a codeword, and the controller outputs the corrected data as a corrected codeword in response to determining that there are no bit errors in a current state of the codeword after the second decoding operation.

9. The method of claim 7, further comprising implementing a recovery mechanism to correct one or more bit errors in the data in response to determining that bit errors are still present in the data after the second decoding operation.

10. The method of claim 1, wherein the first decoding operation includes first decoding iterations that are implemented by the controller to correct the bit error in the one or more weak bits of the data.

11. The method of claim 10, wherein each of the one or more strong bits are skipped during the first decoding iteration.

12. The method of claim 10, wherein the second decoding operation includes second decoding iterations that are implemented by the controller to correct the bit error in the one or more strong bits and any remaining weak bits in the data that had not been corrected by the decoder during the first decoding operation.

13. The method of claim 12, further comprising:

monitoring, by the controller, a current iteration number of the second decoding iterations;

comparing, by the controller, the current iteration number to an iteration threshold to determine whether the decoder is in a stuck condition; and implementing, by the controller, a third decoding operation to execute the first decoding iterations to correct any remaining weak bits in the data in response to the comparison indicating that the decoder is in the stuck condition.

14. The method of claim 1, wherein the memory device is a Not-AND (NAND) memory device.

15. A system for decoding data in a memory device, comprising:

a memory device;

a processing device coupled to the memory device, the processing device to perform operations comprising:

implementing a first decoding operation to correct a bit error in one or more weak bits of the data from the memory device;

determining whether any bit errors remain in the data in response to the execution of the first decoding operation;

executing a second decoding operation to correct a bit error in one or more strong bits of the data and any remaining weak bits in the data that had not been corrected by the decoder during the first decoding operation in response to determining the data has errors; and providing corrected data in response to correcting errors in the data.

16. The system of claim 15, wherein the first decoding operation is implemented based on a weak bit constraint that causes the controller in the first decoding operation to correct a bit error in one or more unreliable bits of the data corresponding to the one or more weak bits while ignoring more reliable bits of the data corresponding to the strong bits of the data.

17. The system of claim 15, wherein during the first decoding operation the controller uses weak bit-flipping thresholds from a set of bit-flipping thresholds to correct the errors in the data, and during the second decoding operation the controller uses strong, weak, or a combination of weak and strong bit-flipping thresholds from the set of bit-flipping thresholds to correct the errors in the data.

18. The system of claim 17, wherein a recovery mechanism is implemented to correct one or more bit errors in the data in response to determining that bit errors are still present in the data after the second decoding operation.

19. A non-transitory computer-readable storage medium comprising instructions that, when executed by a processing device, cause the processing device to perform operations comprising:

performing a read operation to receive the data from the memory device;

executing a first decoding operation to correct a bit error in one or more weak bits of the data;

determining whether any bit errors remain in the data in response to the execution of the first decoding operation;

executing a second decoding operation to correct a bit error in one or more strong bits of the data and any remaining weak bits in the data that had not been corrected by the decoder during the first decoding operation in response to determining the data has errors; and outputting the data as corrected data in response to correcting errors in the data.

20. The non-transitory computer-readable storage medium of claim 19, wherein the instructions, when executed by the processor device, further cause the processing device to perform operations that include executing a recovery mechanism to correct bit errors in the data in response to determining that bit errors are still present in the data after the second decoding operation.

* * * * *